W. Wilson,
Latch,
Nº 3,839.    Patented Nov. 26, 1844.
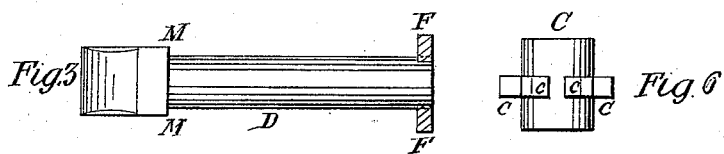

UNITED STATES PATENT OFFICE.

WILLIAM WILSON, OF NORTHAMPTON, MASSACHUSETTS.

MORTISE-LATCH FOR DOORS.

Specification of Letters Patent No. 3,839, dated November 26, 1844.

*To all whom it may concern:*

Be it known that I, WILLIAM WILSON, of Northampton, in the county of Hampshire and State of Massachusetts, have invented certain new and useful Improvements in the Manner of Constructing Spring Mortise-Latches; and I do hereby declare that the following is a full and exact description thereof.

The outer case, or body, of my latch I make cylindrical, so that it may be let into the edge of a door by merely boring a hole therein with a center bit, or other tool; it may, however, vary from the cylindrical form and yet pass into a hole bored to receive it, nor do I intend to claim this particular form as new. The outer case I cast in two equal parts, or semi-cylinders, and these, when put together are attached to each other by means of the face plate at their fore end, and a screw, or a rivet, at their rear end. The spring bolt is forced forward by means of a spiral spring which surrounds it, as is frequently done in other spring locks and latches. At its rear end, the bolt has two horns, or projecting pins, which pass into slots made in two slides which work back and forth in slots, or openings, made to receive them at the rear end of the cylindrical casing. The two slides constitute two racks, into openings in which the teeth of a pinion engage that surrounds the handle shaft; and when this shaft is turned, by means of the knobs, or handles, in either direction, one of the slides is caused to advance, and the other to retreat, the bolt being retracted by the latter, in consequence of its being acted upon by the horn, or pin, that enters such slide.

In the accompanying drawings, Figure 1 represents my cylindrical latch, with one-half of the outer casing removed for the purpose of showing the arrangement of the interior; Fig. 2, shows the half of the cylindrical case so removed. Fig. 3, is the spring bolt, having the horns, or pins, projecting from its rear end. Fig. 4, is the same with Fig. 2, but turned one-quarter round. Fig. 5, is the face plate which is received on the fore end of the cylindrical case, and is to be screwed on to the edge of the door. Fig. 6, is the toothed pinion which receives the shaft of the handle, and operates as a cam, or tumbler, in retracting the bolt. Figs. 7, 7, are the two slides which occupy two recesses, or slots, at the junction of the two semi-cylinders forming the case of the bolt; in each of these figures, where like parts are shown they are designated by the same letters of reference.

A, A, is the outer case; each of the semi-cylinders forming this outer case has a recess cast in it, on each of its sides, as seen at B, B, Fig. 2, so that when they are put together these recesses constitute slots which receive the slides, Figs. 7, 7. They have also a hole, E, E, through them to admit the ends of the pinion, C, Fig. 6. The bolt, D, is surrounded by a spiral spring a, a, one end of which bears against the shoulder, M, M, of said bolt, and the other against a rim, N, N, within the casing. The slides, I, I, that occupy the recesses, B, B, have slots, b, b, in them, which receive the horns, or pins, F, F, on the bolt; and when one of these slides is moved backward, it will, of course, retract the bolt, the pin, F, being kept against the outer end of the slot by the spiral spring. Upon the pinion, C, there are teeth, c, c, c, that take into the openings, d, d, in the slides, which openings convert said slides into racks; and it will be seen that under this arrangement the bolt will be retracted by one or other of the slides, in whichever way the shaft may be turned, the recesses in which the slides move being long enough to admit of the advance of one of them when the other is forced back. The slides, I, I, are formed with a rabbet on their under sides, to keep them in place and to guide them back and forth, as shown in the cross section of them, at I'.

The two semi-cylinders (constituting the outer casing) I confine together in the following manner. Upon the under side of the face plate, G, G, Fig. 5, I cast a projecting rim, O, O, the interior of which is of such size as just to admit the end of the cylindrical case. On each segment of this case I cast, or insert, a pin R, sloping outward, as shown in Fig. 4, and through the plate G, I drill two holes, obliquely, as at P, P, to receive the pins, R, R. When these pins are inserted in the holes, and the two sections of the outer case are brought together, the plate will be firmly held in place, and if a screw, S, be then inserted in the rear end of the case, the whole will be securely combined, and may be readily taken apart.

Having thus fully made known and described the manner in which I arrange and combine the respective parts of my cylindrical mortise latch, what I claim therein as new, and desire to secure by Letters Patent, is—

5   The manner of retracting the bolt by means of two slides, actuated by means of a toothed pinion; said slides receiving the horns of the bolt, and constituting two racks formed and operating substantially as set forth.

WM. WILSON.

Witnesses:
    WM. F. ARNOLA,
    HENRY DIKEMAN.